(12) United States Patent
Beasley et al.

(10) Patent No.: US 7,916,576 B2
(45) Date of Patent: Mar. 29, 2011

(54) OPTIMIZING A SEISMIC SURVEY FOR SOURCE SEPARATION

(75) Inventors: Craig J. Beasley, Houston, TX (US); William Henry Dragoset, Jr., Houston, TX (US); Ian Moore, Highfields Caldecote (GB)

(73) Assignee: WesternGeco L.L.C., Houston, TX (US)

( * ) Notice: Subject to any disclaimer, the term of this patent is extended or adjusted under 35 U.S.C. 154(b) by 26 days.

(21) Appl. No.: 12/174,310

(22) Filed: Jul. 16, 2008

(65) Prior Publication Data

US 2010/0014381 A1    Jan. 21, 2010

(51) Int. Cl.
*G01V 1/00* (2006.01)
(52) U.S. Cl. .......................... 367/38; 181/114
(58) Field of Classification Search ............. 367/15–20, 367/23, 38, 41; 702/14; 181/108, 112–114, 181/121
See application file for complete search history.

(56) References Cited

U.S. PATENT DOCUMENTS

| | | | |
|---|---|---|---|
| 3,984,805 A * | 10/1976 | Silverman | 367/190 |
| 4,953,657 A | 9/1990 | Edington | |
| 5,703,833 A * | 12/1997 | Allen | 367/46 |
| 5,761,152 A | 6/1998 | Jacobsen et al. | |
| 5,924,049 A | 7/1999 | Beasley et al. | |
| 6,545,944 B2 * | 4/2003 | de Kok | 367/56 |
| 6,789,018 B1 * | 9/2004 | Khan | 702/2 |
| 6,882,938 B2 | 4/2005 | Vaage et al. | |
| 6,906,981 B2 * | 6/2005 | Vaage | 367/21 |
| 2004/0013036 A1 | 1/2004 | Fageras et al. | |
| 2005/0027454 A1 | 2/2005 | Vaage et al. | |
| 2005/0128874 A1 | 6/2005 | Herkenhoff | |
| 2006/0164916 A1 * | 7/2006 | Krohn et al. | 367/41 |
| 2008/0019215 A1 | 1/2008 | Robertsson et al. | |
| 2008/0316860 A1 * | 12/2008 | Muyzert et al. | 367/25 |
| 2009/0210158 A1 * | 8/2009 | German | 702/2 |
| 2010/0020641 A1 * | 1/2010 | Eick et al. | 367/38 |

OTHER PUBLICATIONS

Beasley, et al, A New Look at Simultaneous Sources, 1998 SEG Expanded Abstracts, 1998.
Manin, et al., Industrial and Seismic Noise Removal in Marine Processing, EAEG 55th Meeting and Technical Meeting, 1993.
Lynn, Experimental Investigation of Interference from Other Seismic Crews, Geophysics 198611, p. 1501-1524.
PCT Search Report, dated Jan. 29, 2010, Application No. PCT/US2009/050554.

* cited by examiner

*Primary Examiner* — Jack Keith
*Assistant Examiner* — Krystine Breier (57) ABSTRACT

A technique includes determining at least one parameter that characterizes a seismic survey in which multiple interfering seismic sources are fired and seismic sensors sense energy that is produced by the seismic sources. The determination of the parameter(s) includes optimizing the seismic survey for separation of the sensed energy according to the seismic sources.

8 Claims, 5 Drawing Sheets

OPTIMIZING A SEISMIC SURVEY FOR SOURCE SEPARATION

BACKGROUND

The invention generally relates to optimizing a seismic survey for source separation.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes determining at least one parameter that characterizes a seismic survey in which multiple interfering seismic sources are fired and seismic sensors sense energy that is produced by the seismic sources. The determination of the parameter(s) includes optimizing the seismic survey for separation of the sensed energy according to the seismic sources.

In an embodiment of the invention, a system includes seismic sources and seismic sensors, which are adapted to sense energy that is produced by the firing of the seismic sources. The system is optimized for separation of the sensed energy according to the seismic sources.

In yet another embodiment of the invention, a system includes a memory and a processor. The memory stores instructions that when executed by the processor cause the processor to process at least one parameter that characterizes a seismic survey to optimize the seismic survey for separation of sensed energy produced by multiple interfering seismic sources.

Advantages and other features of the invention will become apparent from the following drawing, description and claims.

DETAILED DESCRIPTION

Figure 1:
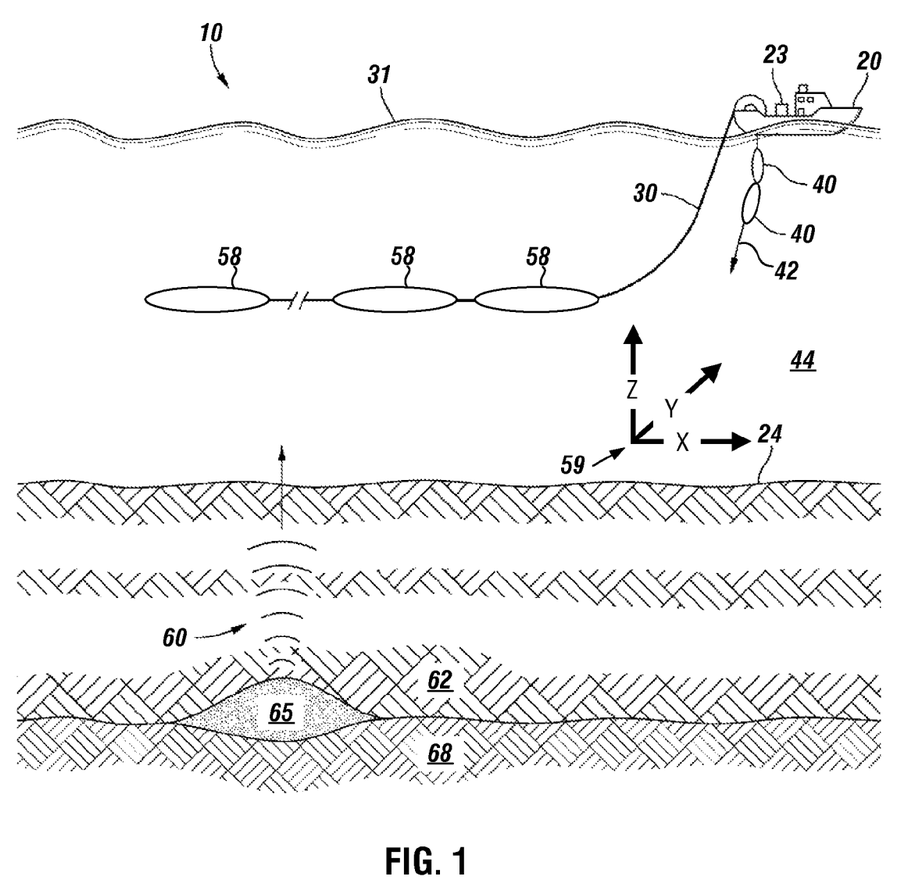
FIG. 1 is a schematic diagram of a marine-based seismic acquisition system according to an embodiment of the invention.

FIG. 1 depicts an embodiment 10 of a marine-based seismic data acquisition system in accordance with some embodiments of the invention. In the system 10, a survey vessel 20 tows one or more seismic streamers 30 (one exemplary streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensors 58, which may be, depending on the particular embodiment of the invention, hydrophones (as one non-limiting example) to acquire pressure data or multi-component sensors. For embodiments of the invention in which the sensors 58 are multi-component sensors (as another non-limiting example), each sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the sensor. It is noted that the multi-component seismic sensor may be implemented as a single device (as depicted in FIG. 1) or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes seismic sources 40 (two exemplary seismic sources 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor 58 may provide a trace, which corresponds to a measure of a pressure wavefield by its hydrophone; and the sensor 58 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system that may be, for example, located on land or on the vessel 20. Thus, many variations are possible and are within the scope of the appended claims.

A particular seismic source 40 may be formed from an array of seismic source elements (such as air guns, for example) that may be arranged in strings (gun strings, for example) of the array. Alternatively, a particular seismic source 40 may be formed from one or a predetermined number of air guns of an array, may be formed from multiple arrays, etc. Regardless of the particular composition of the seismic sources, the sources may be fired in a particular time sequence during the survey.

There are many physical constraints in acquiring seismic data, such as the relationship of the record length to the acquisition efficiency. More specifically, the energy that is sensed by the seismic sensors due to a given firing, or "shot," of a seismic source typically is recorded from a time interval that spans from the time at which the shot occurred and ends slightly before the time at which the next shot occurs. For purposes of increasing the efficiency, techniques, such as the one disclosed in U.S. Pat. No. 5,924,049, entitled "METHODS FOR ACQUIRING AND PROCESSING SEISMIC DATA," which issued on Jul. 13, 1999, allow multiple seismic sources to fire simultaneously and essentially allow more than one record to be recorded at the same time.

Therefore, the seismic sources 40 may be fired in a sequence such that multiple seismic sources 40 may be fired simultaneously or near simultaneously in a short interval of time so that a composite energy signal that is sensed by the seismic sensors 58 contains a significant amount of energy from more than one seismic source 40. In other words, the seismic sources interfere with each other such that the composite energy signal is not easily separable into signals that are attributed to the specific seismic sources. However, source separation techniques may be applied to process the acquired seismic data to form datasets that are each associated with one of the seismic sources 40 so that each dataset ideally indicates the component of the composite seismic energy signal that is attributable to an associated seismic source 40. The source separation typically is not perfect such that some of the sensed energy (called the "residual energy") is ultimately not attributed to any of the seismic sources, and some of the sensed energy (called the "leakage energy") may be attributed to the wrong seismic source by the separation process.

Figure 2:
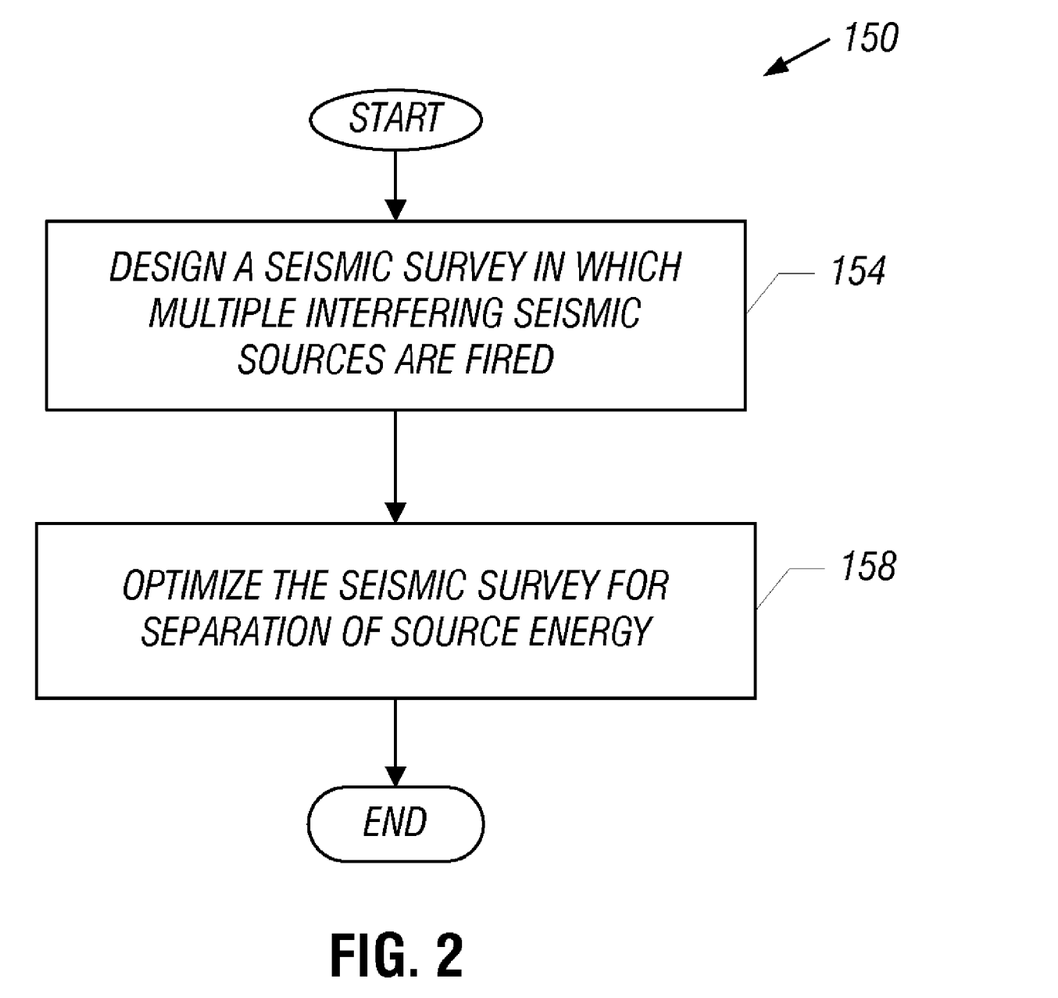
FIGS. 2, 3 and 4 are flow diagrams depicting techniques to design a seismic survey according to embodiments of the invention.

The seismic survey has a number of characterizing parameters, which affect the quality of the source separation. More specifically, such parameters as the timing sequence that governs the seismic source firings, the source geometry (crossline and inline separations of air guns, for example) and the receiver geometry (the type of spread and the crossline and inline separations of the seismic sensors 58, as examples) may influence how effectively the source energy is separated. In accordance with embodiments of the invention described herein, a technique 150 that is depicted in FIG. 2 is used for purposes of designing a seismic survey. Referring to FIG. 2, pursuant to the technique 150, a seismic survey is designed (block 154) in which multiple interfering seismic sources are fired. The acquired seismic data are processed for purposes of separating the sensed source energy according to the seismic sources. Pursuant to block 158 of the technique 150, the seismic survey is optimized for the separation of the source energy. In other words, the technique 150 includes determining one or more parameters of the survey for the purpose of optimizing source separation.

As further described herein, the optimized survey parameters may be parameters related to the geometry of the seismic sources, such as the number of seismic sources, crossline source spacing, inline source spacing, specific source locations, etc.; the receiver geometry; the times at which the seismic sources are fired relative to each other (i.e., the timing sequence for the source firings); the relationship between the timing sequence of source firings and frequency; etc.

Although a towed marine seismic survey is described herein for purposes of example, it is understood that the techniques and systems that are described herein may be likewise be applied to any other type of survey that has interfering seismic sources, such as non-towed marine surveys, land-based surveys, seabed cable-based surveys, vibroseis surveys, etc. For example, in accordance with other embodiments of the invention, such parameters as source frequencies, source amplitudes and the source firing timing sequence of a vibroseis survey may be optimized for purposes of source separation.

As another example, in accordance with embodiments of the invention, the systems and techniques that are described herein may be applied for purposes of optimizing a borehole survey system in which the seismic sources and/or seismic sensors may be disposed in a wellbore. Thus, many variations are contemplated and are within the scope of the appended claims.

Figure 3:
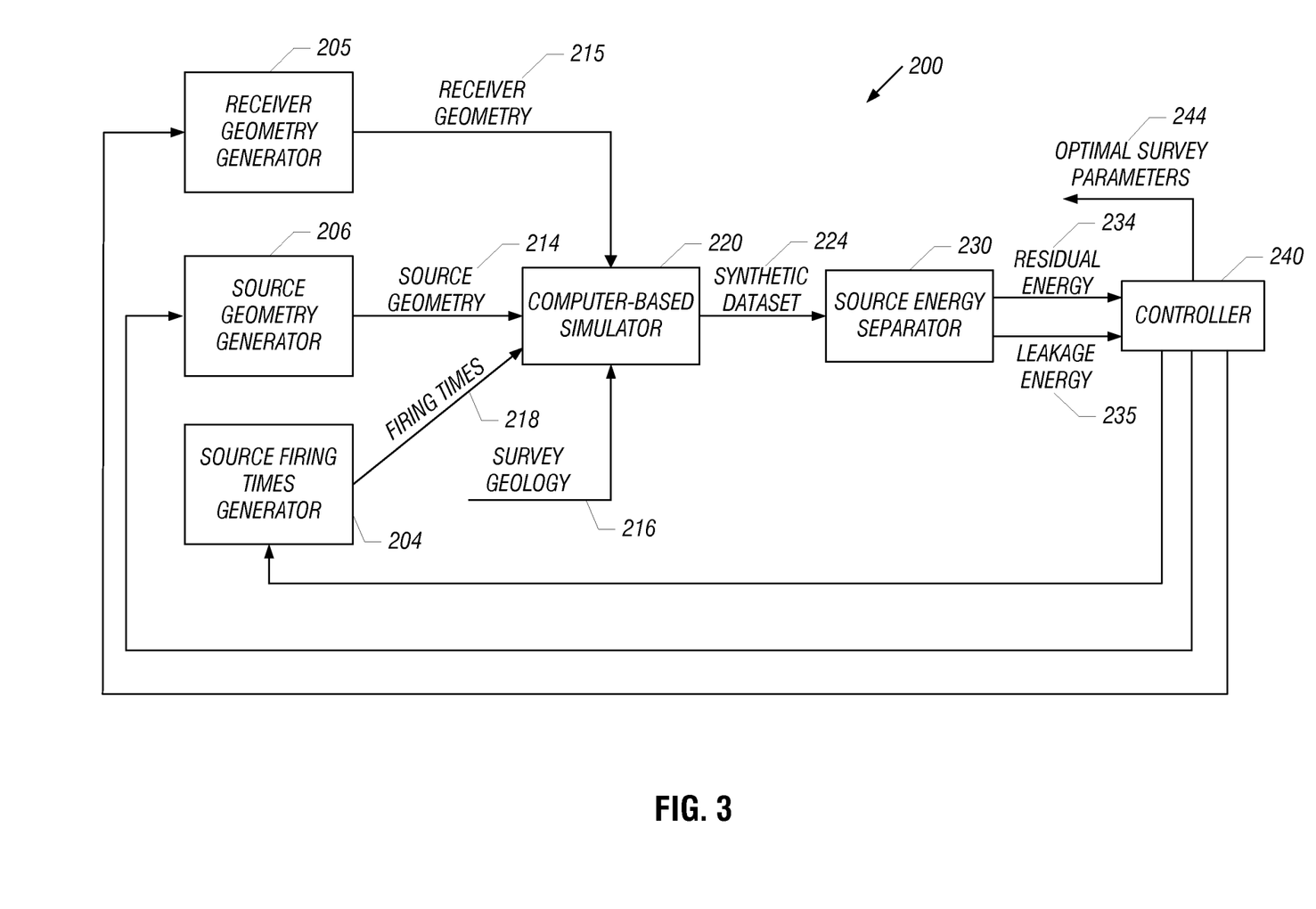

FIG. 3 depicts a system 200 for designing a seismic survey according to some embodiments of the invention. The system 200 may be implemented solely by software executing on one or more processor-based systems, or may be implemented as a combination of software and hardware, depending on the particular embodiment of the invention. The system 200 may be used when the survey geology is known (such as the geology that is known from the results of a prior survey, for example) or at least when a reasonable estimate of the survey geology may be determined. For example, the system 200 may be used, in accordance with some embodiments of the invention, based on a 1D estimate, which assumes that the geology only varies in the vertical direction and does not vary in the horizontal direction.

The system 200 includes a computer-based simulator 220 that applies a numerical processing technique for purposes of optimizing survey parameters for source separation. More specifically, in accordance with some embodiments of the invention, the computer-based simulator 220 performs a Monte Carlo simulation, which models the survey system based on randomly or pseudo randomly generated inputs. The simulation and inputs may be, however, subject to various constraints. Therefore, survey parameters, such as firing times, source geometry, receiver geometry (i.e., the geometry of the seismic sensors), etc., may be randomly or pseudo randomly varied within predefined ranges for purposes of determining the optimal survey parameters for source separation.

More specifically, as depicted for purposes of example in FIG. 3, the computer-based simulator 220 may receive data 216, which are indicative of the survey geology, as well as data 214, 215 and 218, which are indicative of the source geometry, receiver geometry and firing times, respectively. It is noted that, depending on the particular embodiment of the invention, the source geometry data 214, receiver geometry data 215 and firing time data 218 may be generated by random, pseudo random or non-random source geometry 206, receiver geometry 205 and source firing time 204 generators, respectively. Thus, the generators 204, 205 and 206 may generate random source geometries, receiver geometries and firing times within predefined ranges, in accordance with some embodiments of the invention.

The manner in which the source geometries, receiver geometries and firing times are generated may be varied, depending on the particular embodiment of the invention. As examples, the source and receiver geometries may be held constant while the optimal firing times are determined; the source geometries, receiver geometries and firing times may simultaneously randomly varied; the firing times and receiver geometries may be held constant while optimal source geometry parameters are determined; etc. Thus, many variations are contemplated and are within the scope of the appended claims.

The computer-based simulator 220 generates a synthetic dataset 224, which is the seismic dataset that is predicted to be acquired by seismic sensors in an actual survey that is defined by the current survey geology and survey parameters that are received as inputs by the computer-based simulator 220. The synthetic dataset 224 indicates the predicted sensed composite energy signal that is produced by the interfering seismic sources 40. Based on the synthetic dataset 224, a source energy separator 230 of the system 200 produces multiple datasets, each of which is attributable to a particular seismic source.

It is noted that the source energy separator 230 may employ a numerical inversion algorithm (performed via instructions executing on a computer), which involves inversion of a linear system (as a non-limiting example). The source energy separation may be unable to attribute all of the energy to one of the seismic sources, which means the processing by the source energy separator 230 produces a residual energy. Also, there is leakage energy, which is energy that is produced by one seismic source but is attributed to a different seismic source by the separation process. Mathematically, if the recorded data are $d=d_1+d_2$, and the estimated data are $d_1'$ and $d_2'$, then the residual is $d_1'+d_2'-d$; and the leakage is $d_1'-d_1$ for seismic source $S_1$, and $d_2'-d_2$ for seismic source $S_2$.

Thus, the residual and leakage energies indicate a degree of error in the source separation, as ideally, the residual and leakage energies are zero, in that ideally all of the sensed energy is partitioned among and correctly to the seismic sources. Therefore, in accordance with some embodiments of the invention, optimization of the seismic survey occurs when the seismic survey is characterized by a set of parameters that minimizes the residual and leakage energies or at least produces residual and leakage energies that are below selected thresholds.

In accordance with embodiments of the invention, a controller 240 of the system 200 receives data 234 from the source energy separator 230, which is indicative of the residual energy. The controller 240 changes one or more survey parameters (by changing the source firing times or source geometry, as non-limiting examples), until, based on the residual energy data 234 and leakage energy data 235, the controller 240 determines that these energies have been sufficiently minimized. For example, the controller 240 may continue running the receiver geometry 205, source geometry 206 and firing time 204 generators, the controller 240 may change the input ranges, the controller 240 may hold some inputs constant while varying others, etc. Once the controller 240 determines that the residual and leakage energies have been sufficiently minimized, the controller 240 provides data 244, which are indicative of the optimal survey parameters.

Figure 4:
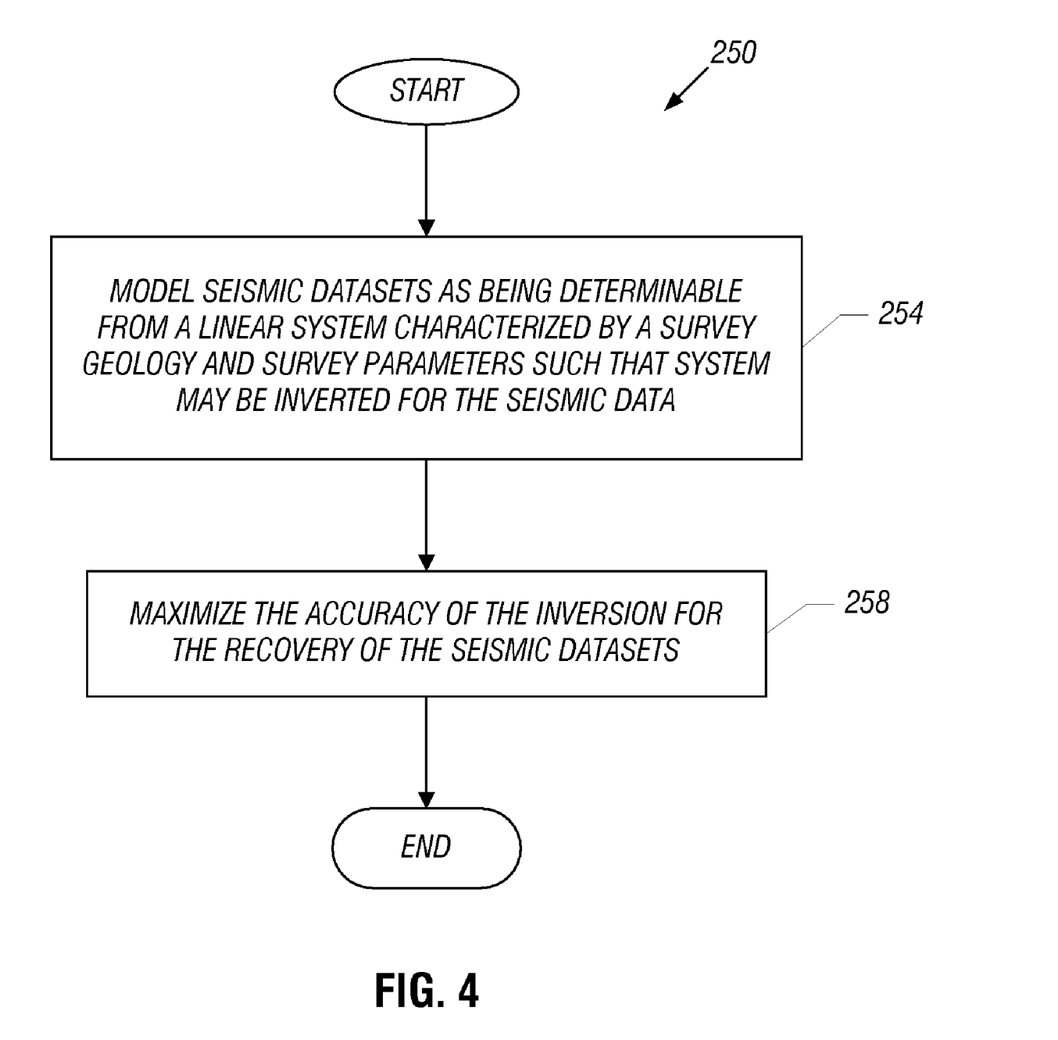

In some cases, the survey geology may be unknown or a reliable estimate of the geology may be unavailable. For such cases, survey parameters may be optimized for source energy separation based on a linear system that characterizes the survey system. As a more specific example, referring to FIG. 4, in accordance with some embodiments of the invention, a technique 250 to optimize survey parameters includes modeling (block 254) seismic datasets as being determinable from a linear system that is characterized by a survey geology and survey parameters. Each dataset is associated with the sensed energy uniquely attributable to a different seismic source. The linear system may be inverted for the seismic datasets. The survey parameters are optimized for source separation by maximizing the accuracy of the inversion for the recovery of the datasets, pursuant to block 258.

As a more specific example, in accordance with some embodiments of the invention, source dithering (i.e., using a source firing timing sequence in which the source firing times are slightly offset for each other) may be used for purposes of enabling the separation of interfering seismic sources as described in U.S. patent application Ser. No. 11/964,402, entitled, "SEPARATING SEISMIC SIGNALS PRODUCED BY INTERFERING SEISMIC SOURCES," which was filed on Dec. 26, 2007, and is hereby incorporated by reference in its entirety. Linear operator transforms may be used in a model of the survey system for purposes of decomposing the sensed composite energy signal into signals that are each uniquely associated with a particular seismic source. The invertability of a matrix of this system is maximized for purposes of determining an optimum survey design from the standpoint of source separation.

More specifically, the seismic data (referred to herein as a "seismic data vector d") is deemed to be acquired by seismic sensors due to the firings of N (i.e., multiple) seismic sources. Thus, the simultaneous or near simultaneous firing of the seismic sources causes significant energy from all of these firings to be present in the seismic data vector d. Models, which describe the geology that affects the source energy are associated with linear operators that describe the physics of the source mechanisms, the wave propagation and the survey geometry. The seismic data vector d may then be characterized as a function of the models and the linear operators. Thus, in theory, the function may be jointly inverted for the models, which permits the seismic data vector d to be separated into N seismic datasets $d_1, d_2, d_3 \ldots d_N$ such that each dataset is uniquely attributable to one of the seismic sources. In other words, each dataset represents a component of the sensed composite energy signal, which is uniquely attributable to one of the seismic sources.

As a more specific example, assume that the seismic data vector d is acquired due to the near simultaneous firing of two seismic sources called "$S_1$" and "$S_2$." For this example, the seismic sources $S_1$ and $S_2$ are fired pursuant to a timing sequence, which may be based on a predetermined timing pattern or may be based on random or pseudo-random times. Regardless of the particular timing scheme, it is assumed for this example that the seismic source $S_1$ is fired before the seismic source $S_2$ for all traces, and it is further assumed that the zero times of the traces correspond to the firing times for $S_1$. Thus, the zero times of the traces are in "$S_1$ time." The offsets, or vectors, to the seismic sources $S_1$ and $S_2$ are called "$x^1$" and "$x^2$," respectively. The timing delays, denoted by "t" for the seismic source $S_2$ are known for each trace.

It is assumed for this example that the collection of traces are such that the values of t are random. In practice, this is the case for a CMP, receiver or common offset gather. For purposes of simplifying this discussion, it is assumed that the trace in each gather may be located with respect to the seismic source $S_1$ and seismic source $S_2$ using scalar quantities called "$x^1_i$" and "$x^2_i$," respectively. In this notation, the subscript "i" denotes the trace number in the gather. As a more specific example, for a CMP gather, "$x^1_i$" may be the scalar offset to the seismic source $S_1$, and these quantities are referred to as offsets below. Similarly, "$t_i$" denotes the timing delay for the $i^{th}$ trace.

The recorded energy for the seismic source $S_1$ may be modeled by applying a linear operator called "$L_1$," (which represents the physics of the seismic source $S_1$, the wave propagation associated with the source $S_1$ and the survey geometry associated with the seismic source $S_1$) to an unknown model called "$m_1$," which describes the geology that affects the energy that propagates from the seismic source $S_1$. The model $m_1$ contains one element for each parameter in the model space. Typically the model space may be parameterized by slowness or its square, corresponding to linear or hyperbolic/parabolic Radon transforms, respectively. The linear operator $L_1$ is a function of the offsets to the source $S_1$, the parameters that characterize the model space, and time or frequency. A seismic data vector $d_1$ contains one element for each trace (at each time or frequency) and is the component of the seismic data d, which is associated with the seismic source $S_1$. In other words, the seismic data vector $d_1$ represents the dataset attributable to the seismic source $S_1$. The seismic data vector $d_1$ may be described as follows:

$$d_1 = L_1 m_1. \quad \text{Eq. 1}$$

The energy that is associated with the seismic source $S_2$ appears incoherent in the seismic data vector d. However, the energy is related to a coherent dataset in which the firing times for the seismic source $S_2$ are at time zero (i.e., seismic source $S_2$ time) by the application of time shifts $t_i$ to the traces. A diagonal linear operator called "$D_2$" may be used for purposes of describing these time shifts, such that the component of the seismic data vector d, which is associated with the seismic source $S_2$ and which is called "$d_2$" may be described as follows:

$$d_2 = D_2 L_2 m_2. \quad \text{Eq. 2}$$

In Eq. 2, a linear operator called "$L_2$" represents the physics of the seismic source $S_2$, the wave propagation associated with the seismic source $S_2$ and the survey geometry associated with the seismic source $S_2$. Also in Eq. 2, a model called "$m_2$" describes the geology that affects the energy that propagates from the seismic source $S_2$.

The composite seismic energy signal that is recorded by the seismic sensors is attributable to both seismic sources $S_1$ and $S_2$. Thus, the seismic data vector d (i.e., the recorded data) is a combination of the seismic data vectors $d_1$ and $d_2$, as described below:

$$d = d_1 + d_2. \quad \text{Eq. 3}$$

Due to the relationships in Eqs. 1, 2 and 3, the seismic data vector d may be represented as the following linear system:

$$d = [L_1 \quad D_2 L_2] \begin{bmatrix} m_1 \\ m_2 \end{bmatrix}. \quad \text{Eq. 4}$$

Thus, Eq. 4 may be solved (i.e., jointly inverted) for the model vector m (i.e., ($m_1$; $m_2$)) using standard techniques, such as the least squares algorithm; and after the model vector m is known, Eqs. 1 and 2 may be applied with the models $m_1$ and $m_2$ for purposes of separating the seismic data vector d into the seismic data vectors $d_1$ and $d_2$, i.e., into the datasets that indicate the measurements attributable to each seismic source.

Eq. 4 may be inverted in the frequency ($\omega$) domain. In that case, $(D_2)_{jk} = \exp(-i\omega t_j)\delta_{jk}$ and $(L_s)_{jk} = \exp(-i\omega t^s_{jk})$, where $t^s_{jk}$ is the time shift associated with offset $x^s_j$ and the parameter for the $k^{th}$ trace in the model space associated with $S_s$. For a linear Radon transform parameterized by slowness, $p^s_k$, $t^s_{jk} = x^s_j p^s_k$. For a parabolic Radon transform parameterized by curvature, $q^s_k$, $t^s_{jk} = (x^s_j)^2 q^s_k$.

The success of the source separation technique described above depends on the ability of the transform to separate the energy associated with the two sources. Unlike most applications of Radon transforms, success does not depend on the ability to focus energy at the correct model parameter within $m_1$ or $m_2$. When random or pseudo time delays are used between source firings, the basis functions for the two model domains ($t^1_{jk}$ and $t_j + t^2_{jk}$) are very different, and this enables extremely effective separation of the sources.

In accordance with embodiments of the invention, survey parameters are determined that maximize the invertability of the matrix $L = [L_1 D_2 L_2]$ (see Eq. 4) for purposes of optimizing the survey for source separation. It is noted that, as can be appreciated by one of skill in the art, the degree of invertability of a matrix may be evaluated by such techniques as evaluating the Hessian, the condition number of the matrix, the sparseness of the matrix and the matrix's eigenvalue distribution. Thus, the optimal survey parameters (timing sequence of source firings, source geometry, etc.) are the parameters that maximize the matrix's invertability.

It is noted that making L invertible is sufficient for optimization but not required. If L is invertible, then d=Lm may be solved for m, where $$m = \begin{pmatrix} m_1 \\ m_2 \end{pmatrix},$$

but $m_1$ and $m_2$ do not need to be recovered explicitly. It is enough to recover $d_1$ and $d_2$, as given by Eq. 1 and 2. The "wrong" $m_1$ and $m_2$ may be recovered, but the correct $d_1$ and $d_2$ are recovered. This happens provided $m_1$ models all the energy associated with the seismic source $S_1$ and $m_2$ models all of the energy associated with the seismic source $S_2$, etc., even though it is in the wrong place within the model. It is maximizing the invertibility of L in this generalized sense that is important.

Mathematically, if M is defined as $$\begin{pmatrix} M_1 \\ M_2 \end{pmatrix},$$

a generalized inverse of L, then the estimate of $$\begin{pmatrix} d_1 \\ d_2 \end{pmatrix}$$

is as follows:

$$\begin{pmatrix} L_1 & 0 \\ 0 & D_2 L_2 \end{pmatrix} \begin{pmatrix} M_1 \\ M_2 \end{pmatrix} (L_1 m_1 + D_2 L_2 m_2), \quad \text{Eq. 5}$$

The data $d_1$ is considered to be of the form $L_1 m_1$, etc., so $M_1$ and $M_2$ satisfy the following relationship:

$$\begin{pmatrix} L_1 m_1 \\ D_2 L_2 m_2 \end{pmatrix} = \begin{pmatrix} L_1 M_1 L_1 & L_1 M_1 D_2 L_2 \\ D_2 L_2 M_2 L_1 & D_2 L_2 M_2 D_2 L_2 \end{pmatrix} \begin{pmatrix} m_1 \\ m_2 \end{pmatrix}, \quad \text{Eq. 6}$$

or $$\begin{pmatrix} L_1(M_1 L_1 - I) & L_1 M_1 D_2 L_2 \\ D_2 L_2 M_2 L_1 & D_2 L_2 (M_2 D_2 L_2 - I) \end{pmatrix} \begin{pmatrix} m_1 \\ m_2 \end{pmatrix} = 0. \quad \text{Eq. 7}$$

Eq. 7 is satisfied for all $m_1$ and $m_2$, so $L_1(M_1 L_1 - I) = 0$, $L_1 M_1 D_2 L_2 = 0$, $D_2 L_2 M_2 L_1 = 0$ and $D_2 L_2 (M_2 D_2 L_2 - I) = 0$, where "I" represents the identity matrix. This is more general, and more easily satisfied than making M the inverse of L, which requires $M_1 L_1 = 1$, $M_1 D_2 L_2 = 0$, $M_2 L_1 = 0$ and $M_2 D_2 L_2 = 1$. For example, $M_1 D_2 L_2$ needs to be in the null space of $L_1$ and not necessarily zero.

Although by way of example a linear system has been described herein, it is noted that the survey may be optimized for source separation using a non-linear system, in accordance with other embodiments of the invention.

Figure 5:
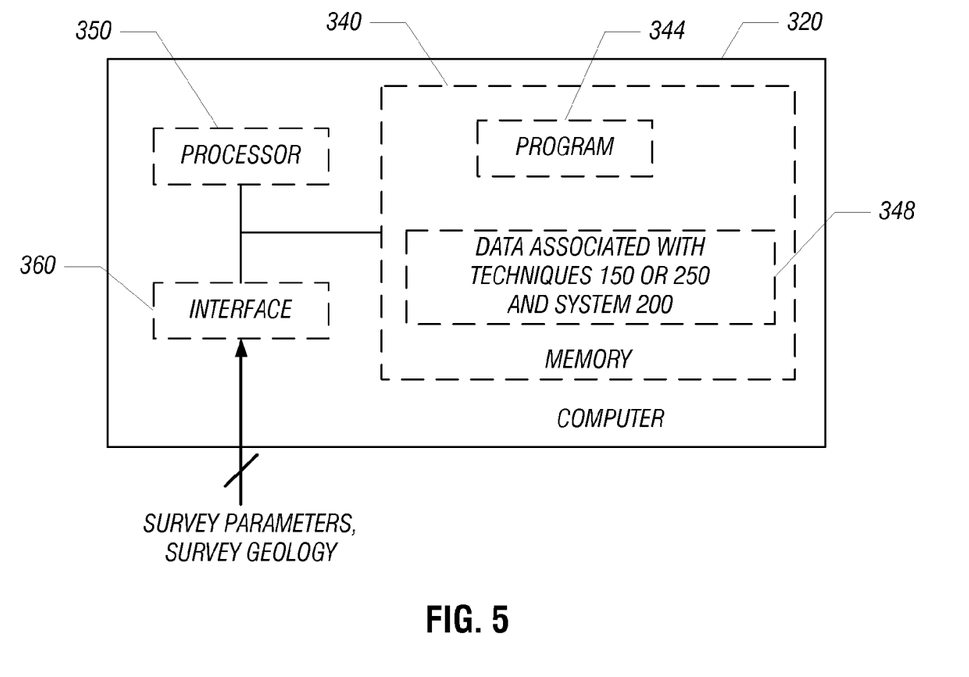
FIG. 5 is a schematic diagram of a data processing system according to an embodiment of the invention.

Referring to FIG. 5, in accordance with some embodiments of the invention, a data processing system 320 may perform at least some parts of one or more of the techniques that are disclosed herein for purposes of optimizing a seismic survey for source separation. In accordance with some embodiments of the invention, the system 320 may include a processor 350, such as one or more microprocessors and/or microcontrollers. The processor 350 may be located on a streamer 30 (FIG. 1), located on the vessel 20 or located at a land-based processing facility (as examples), depending on the particular embodiment of the invention.

The processor 350 may be coupled to a communication interface 360 for purposes of receiving such data as acquired seismic data, geology measurement data, geology estimate data, survey parameter data indicative of constraints for the survey parameters, ranges for the survey parameters, etc. In accordance with embodiments of the invention described herein, the processor 350, when executing instructions stored in a memory of the seismic data processing system 320, may implement one or more of the processing blocks that are depicted in FIG. 3 or may aid in performing one or more of the processing steps depicted in FIGS. 2 and 4.

As examples, the communication interface 360 may be a Universal Serial Bus (USB) interface, a network interface, a removable media (such as a flash card, CD-ROM, etc.) interface or a magnetic storage interface (IDE or SCSI interfaces, as examples). Thus, the communication interface 360 may take on numerous forms, depending on the particular embodiment of the invention.

In accordance with some embodiments of the invention, the communication interface 360 may be coupled to a memory 340 of the system 320 and may store, for example, various input and/or output datasets involved in the determination of the optimal survey parameters. The memory 340 may store program instructions 344, which when executed by the processor 350, may cause the processor 350 to perform various tasks of one or more of the techniques and systems that are disclosed herein, such as the techniques 150 or 250 and the system 200 and display results obtained via the technique(s)/system on a display (not shown in FIG. 5) of the system 320, in accordance with some embodiments of the invention.

Other embodiments are within the scope of the appended claims. For example, although a towed marine-based seismic acquisition system has been described above, the techniques and systems described herein for optimizing a survey for source separation may likewise be applied to other types of seismic acquisition systems. As non-limiting examples, the techniques and system that are described herein may be applied to seabed, borehole and land-based seismic acquisition systems. Thus, the seismic sensors and sources may be stationary or may be towed, depending on the particular embodiment of the invention.

As additional examples of other embodiments of the invention, techniques other than those described above may be used to optimize a survey for source separation. As examples, as can be appreciated by one of skill in the art, such techniques as a Genetic Algorithm, Simulated Annealing Algorithm, Steepest Descent Algorithm or Conjugate Gradient Algorithm may be used to determine optimal survey parameters, in other embodiments of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   determining at least one characterizing parameter of a seismic survey in which multiple seismic sources are fired and seismic sensors sense energy produced by the seismic sources the seismic survey optimized for separation of the sensed energy according to the seismic sources, wherein the optimizing comprises:
   determining a geology associated with the survey;

based on the determined geology, predicting a dataset to be acquired by the seismic sensors based in the survey;

based on the predicted dataset, determining a residual energy not being associated with one of the seismic sources after separation of the energy;

based on the predicted dataset, determining a leakage energy associated with the wrong seismic source; and determining said at least one parameter to minimize the residual energy and the leakage energy.

2. The method of claim 1, wherein the determined geology comprises an estimated geology.

3. The method of claim 1, wherein the determined geology comprises a geology determined from a survey.

4. The method of claim 1, wherein the act of optimizing comprises optimizing a timing sequence that governs the firing of seismic sources.

5. The method of claim 1, wherein the act of optimizing comprises optimizing a geometry of the seismic sources.

6. The method of claim 5, wherein the act of optimizing comprises optimizing an inline spacing or a crossline spacing of the seismic sources.

7. The method of claim 1, wherein the act of optimizing comprises optimizing a geometry of the seismic sensors.

8. The method of claim 7, wherein the act of optimizing comprises optimizing an inline spacing or a crossline spacing of the seismic sensors.

* * * * *